No. 712,187. Patented Oct. 28, 1902.
J. W. FRAZER.
CURD MILL.
(Application filed Feb. 17, 1902.)
(No Model.)
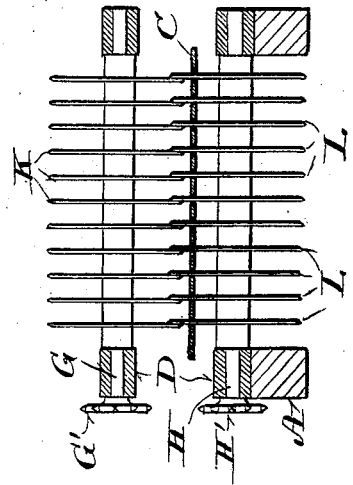
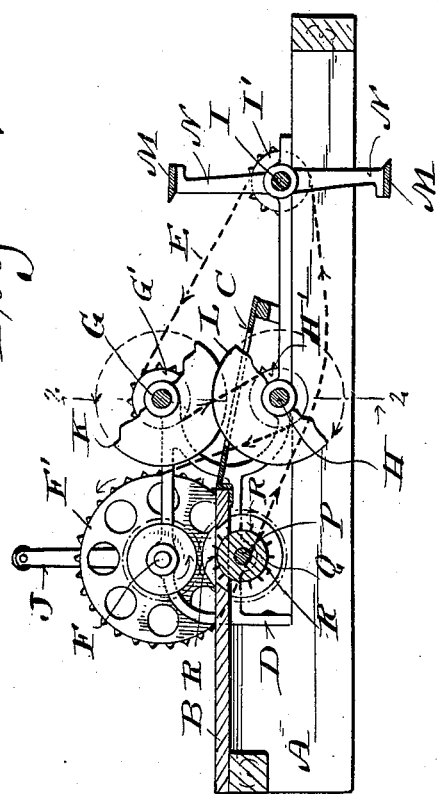
Witnesses
Geo. N. Young.
N. E. Oliphant
Inventor
J. W. Frazer
By H. G. Underwood
Attorney
THE NORRIS PETERS CO., PHOTO-LITHO., WASHINGTON, D. C.

UNITED STATES PATENT OFFICE.

JAMES W. FRAZER, OF FRAZER, WISCONSIN, ASSIGNOR OF ONE-HALF TO MICHAEL LYONS, OF FRAZER, WISCONSIN.

CURD-MILL.

SPECIFICATION forming part of Letters Patent No. 712,187, dated October 28, 1902.

Application filed February 17, 1902. Serial No. 94,385. (No model.)

*To all whom it may concern:*

Be it known that I, JAMES W. FRAZER, a citizen of the United States, and a resident of Frazer, in the county of Shawano and State of Wisconsin, have invented certain new and useful Improvements in Curd-Mills; and I do hereby declare that the following is a full, clear, and exact description thereof.

The improvements consist in certain peculiarities of construction and combination of parts hereinafter particularly set forth with reference to the accompanying drawings and subsequently claimed, the object of the invention being to provide simple economical mills for the disintegration of curd without crushing the same, whereby loosening of butter-fat in said curd is avoided.

Figure 1 of the drawings represents a transverse section view of a curd-mill in accordance with my invention; and Fig. 2, a transverse section view of the mill, the latter view being indicated by line 2 2 in the first figure.

Referring by letter to the drawings, A indicates a frame that in practice sets on a receptacle for cut curd or is otherwise supported over the same. A horizontal rear cover B on the frame serves as a feed-table for slabs of curd, and forward of the table is an inclined curd-support C on said frame. Parallel brackets D of the frame are provided with bearings for a main shaft and a series of counter-shafts. A link belt E is trained on sprocket-wheels F' G' H' I', fast on main shaft F and the counter-shafts G H I, the arrangement of the belt being such that rotation of shaft H is opposite that of the other shafts in train therewith. A crank J is shown in connection with the main shaft for the application of hand-power to drive the mill; but said mill may be organized for drive by other power.

Shafts G H are parallel, and spaced apart on these shafts to rotate therewith are cutting-disks K L, so arranged that those on one of the shafts lap those on the other. Disks L on shaft H project upward through slots in curd-support C, and knives M on radial arms N of shaft I cut past the lower forward edge of said support.

Main shaft F is in spur-gear connection with a counter-shaft P, for which brackets D of the mill-frame are provided with bearings, and a roller Q, fast on the latter shaft, has clearance in a slot of the rear frame-cover or curd-table B above specified. Pegs R radiate from roller Q through the table-slot to facilitate feed of a curd-slab that is slit by the disks K L into longitudinal strips, these strips being cut by the knives M into sections of predetermined length, the longitudinal and transverse cuts being clean and smooth. Hence crushing of said curd and loosening of butter-fat therein is avoided.

Having thus described my invention, what I claim as new, and desire to secure by Letters Patent, is—

A curd-mill comprising a frame having a slotted rear cover-piece constituting a curd-table, a rotary curd-feeder having clearance in the table-slot, an inclined curd-support forward of said table, upper and lower shafts, cutting-disks fast on the shafts at intervals of the same, the lower disks being extended through curd-support slots to lap the upper disks, another shaft provided with radial arms, knives in connection with the arms to cut past the forward lower edge of said curd-support, a main shaft, and gearing connecting the several shafts, this gearing being such that the curd-feeder and a disk-shaft are rotated in an opposite direction to that of the other shafts.

In testimony that I claim the foregoing I have hereunto set my hand, at Cecil, in the county of Shawano and State of Wisconsin, in the presence of two witnesses.

JAMES W. FRAZER.

Witnesses:
J. H. KUEHL,
HARRIET C. FREEBORN.